Patented July 23, 1946

2,404,444

UNITED STATES PATENT OFFICE 2,404,444

ISOMERIZATION PROCESS USING METAL HALIDE COMPLEXES

Charles A. Kraus, Providence, R. I., and John D. Calfee, Westfield, N. J., assignors to Standard Oil Development Company, a corporation of Delaware No Drawing. Application November 16, 1943, Serial No. 510,490

12 Claims. (Cl. 260—683.5)

The present invention relates to the preparation of metal halide complexes which have been found to be suitable for aiding in the effecting of organic reactions such as, for example, the isomerization of normal paraffins to isoparaffins, the alkylation of isoparaffins with monoolefins, the polymerization of monoolefins, the cracking of reduced petroleum crude oils, and the nuclear alkylation of aromatic hydrocarbons with alkyl halides, alcohols and/or monoolefins.

Metal halides of the Friedel-Crafts type have been used in the past to induce a number of reactions among which are those mentioned above, but particularly in the case of the aluminum halides such as aluminum chloride no completely satisfactory catalyst mass has as yet been devised. Continued usage of aluminum chloride catalysts for effecting the isomerization of normal paraffins, the polymerization of olefins, the alkylation of isoparaffins with olefins, and the like, results in a decomposition of the aluminum chloride to form liquid, highly carbonaceous substances which are less efficacious for catalyzing these reactions than the solid fresh aluminum chloride. By the liquefying and degradation of aluminum chloride or aluminum bromide in carrying out such reactions, commercial units oftentimes are required to be shut down and the reactors and catalyst beds cleaned and recharged with fresh catalyst before proceeding with the reaction. This is often expensive and troublesome because of the character of the sludges formed with the aluminum chloride. In addition, of course, the catalyst life is materially reduced due to this sludge formation and too frequently the catalyst must be replaced with fresh aluminum chloride or aluminum bromide catalyst compositions, thereby resulting in an uneconomical operation.

Attempts have been made in the past to improve aluminum chloride catalysts for use in organic reactions, particularly hydrocarbon reactions, by resorting to drastic reaction conditions and short contact times in order to minimize this sludge formation, but these expedients have not been particularly successful since appreciable cracking of the reactants occurred rather than a minimizing of the sludging tendency. Furthermore, under certain reaction conditions which are particularly conducive to catalyzing some organic reactions, such as the isomerization of the higher molecular weight straight chain paraffins, aluminum chloride has been found to be impractical even under the best conditions known, because the cracking tendency of the aluminum chloride appears to be superior to the isomerization tendency and hence aluminum chloride is not particularly suitable for this type of reaction. Furthermore, aluminum chloride and aluminum bromide have been found to be relatively short lived in their activity for the promotion of hydrocarbon isomerizations and condensations.

A principal object of the invention is to isomerize normal paraffins of at least four carbon atoms per molecule to the corresponding branched chain paraffins under isomerization reaction conditions in the presence of these novel catalyst complexes. Other objects of the invention will become apparent upon a fuller understanding of the invention to be hereinafter more fully described.

The catalyst masses described herein remain active for catalyzing organic reactions for a greater length of time than has heretofore been found possible using the ordinary Friedel-Crafts type metal halide catalyst. A simple and convenient method for the preparation of metal halide Friedel-Crafts type catalyst complexes suitable for catalyzing the above mentioned organic reactions are also described. The catalyst mass comprises aluminum halide complexes which are economical to produce and have excellent catalyst life when used to catalyze the above mentioned reactions. The aluminum halide-lower alkoxy metal halide reaction products are of porous structure and adapted for use in catalyzing organic reactions. These complexes are relatively stable and maintain catalytic activity over long periods of time.

The novel catalyst complexes of the present invention are prepared in a number of ways. One method of preparing these catalysts resides in the use of lower alkoxy metal halides or lower trialkoxy metal halides being contacted and admixed with a Friedel-Crafts type catalyst of the metal halide type, followed by heat fusing of the resultant admixture to a temperature sufficiently high to completely fuse the mass. Following fusion, the mass is kept at an elevated temperature of between about 80° C. and about 200° C. until the liquid is converted into a dry solid material and evolution of alkyl halide is essentially complete. A catalyst so prepared has been found to have the desired catalytic activities. A preferred method of preparing the catalyst mass, however, involves not only the heat fusing of the resultant admixture but a further heating to a slightly higher temperature for a length of time to allow for the removal by vaporization of any uncombined or free metal halide contained in the catalyst mass. The removal of the free halide may be accelerated by conducting the sublimation under reduced pressure. This method resulted in a catalyst complex which had even better catalytic activity than the first method of preparation. Still a third method of preparing the catalyst mass resides in the preparation of the metal halide alcohol addition complex in the presence of excess amounts of a Friedel-Crafts type metal halide, followed by heat fusion, formation of the alkoxy halide by splitting out hydrogen chloride, subsequent formation of active catalyst through elimination of the alkyl halide, and the removal of excess Friedel-Crafts type metal halide by heat. Such a method, for example, would involve the reaction of methyl alcohol in the amount of 1 mol with more than 1 mol of aluminum chloride. The preparation of aluminum methoxy halides may be carried out in an anhydrous carbon disulfide medium by adding alcohol to a refluxing mixture of carbon disulfide and the metal halide. The resultant aluminum methoxy compound may then be separated from the solvent and heated at a temperature of 80° C.–200° C. in the presence of excess aluminum chloride to form a compound having an empirical formula of $$AlCl_2OCH_3 \cdot 4AlOCl$$

Methoxy aluminum chloride may be mixed with aluminum bromide and the active catalyst formed by fusing the mixture and then maintaining it at a sufficiently elevated temperature to cause essentially four-fifths of the methyl groups to be evolved as the methyl halide. The empirical composition of the catalyst following removal of all free aluminum halide is $AlX_2OCH_3 \cdot AlOX$ where X may be chlorine or bromine, or both chlorine and bromine in the same molecule. A further example of a particular catalyst prepared in accordance with the process described herein involved the reaction of $AlCl_2OCH_3$ with $SbCl_3$ to give the thermal decomposition product of aluminum methoxy chloride chemically combined in part, at least, with an antimony halide, the antimony content falling between 0.1% by weight of the aluminum compound and that required for the compound $AlCl_2OCH_3 \cdot 4SbOCl$, depending upon the experimental conditions. It is believed, based on experimental determinations, that the empirical formula, $$AlCl_2OCH_3 \cdot 4AlOCl$$

represents a close approximation of the true composition of the type of compounds produced but the invention should be understood as not being limited thereto but as being directed to the compounds produced by the reaction of Friedel-Crafts type metal halides with lower alkyl monohydric alcohols or with the lower alkoxy derivatives of metal halides in accordance with the methods herein outlined. In general, the admixtures of the reactants heretofore mentioned are heated at least to the fusion point and preferably they are heated to a temperature between about 80° C. and about 200° C. for a period of time sufficient to insure completion of the reaction giving rise to the evolution of the alkyl halide. The unreacted metal halide is removed by sublimation upon continued heating, preferably under reduced pressure. As will be seen from the data hereinafter set forth, active catalysts are produced by the decomposition of the metallic alkoxy halide in the presence of free metallic halide and that it is preferable to remove any free or uncombined Friedel-Crafts type metal halide that may be contained therein. The Friedel-Crafts type metal halide may be employed in a substantial molar excess of the amount of lower alkyl monohydric alcohol or lower alkoxy metal halide used, but in such a case it is preferable to remove the excess or uncombined metal halide from the final catalyst complex prior to using the same for catalyzing the heretofore-mentioned organic reactions.

The resultant catalyst complexes appear as a porous, brittle mass, white to light yellow in color. They are non-volatile under the elevated temperatures customarily employed. If desired, the catalyst complexes may be prepared on a carrier such as activated alumina, partially dehydrated bauxite, activated carbon, silica gel, alumina gel and the like. Such a process involves the impregnation of the carrier mass with vapors of aluminum chloride or aluminum bromide or other suitable Friedel-Crafts type catalyst, followed by contacting of the impregnated mass with methyl or ethyl alcohol vapors or some other suitable lower alkyl monohydric alcohol into the carrier mass so impregnated. This mass is then gradually heated to a temperature between about 40° C. and 200° C., thereby forming the novel catalyst complexes within the carrier selected. A stream of superheated inert vapor such as hydrogen, nitrogen, carbon dioxide and the like, may be passed through the carrier mass maintained at the desired temperature so that the mass is thereby freed of any free or uncombined metal halide contained therein.

An excellent method for preparing the catalyst on a suitable support consists of mixing the aluminum methoxide with the aluminum halide, fusing, and before evolution of the alkyl halide commences, soaking the inert carrier in the melt. The carrier may then be removed and the decomposition to form the catalyst conducted at the proper temperature.

The catalysts so formed have been found to be particularly effective in catalyzing the isomerization of normal paraffins to isoparaffins as will be more fully hereinafter described. Although, as has been stated heretofore, it is preferred to use the novel catalyst complexes substantially free of uncombined Friedel-Crafts type metal halide, and, as has previously been stated, some free and uncombined Friedel-Crafts type metal halide catalyst may remain in admixture with the final catalyst complex, it is within the contemplation of the present invention to add further amounts of Friedel-Crafts type catalyst to the resultant catalyst mass and to employ such admixtures as catalysts where the activity of the final catalyst composition demands that a more active catalyst be employed. In general, the novel catalyst complexes herein described may be prepared by admixing a compound having the formula $$(RO)_yM(X)_z$$

with from one to six mols of a metal halide having the formula $$M'X_n$$

wherein R represents a lower alkyl group, preferably methyl or ethyl, M and M' in at least one of the compounds represents a metal whose halide is a Friedel-Crafts type catalyst (M and M' may be the same or a different metal), X represents a halogen such as, for example, chlorine or bromine, $y$ is an integer, 1, 2 or 3, while $z$ represents $3-y$, and $n$ represents an integer of 6 or less. Specific compounds contemplated as the initial reactant in preparing the novel catalyst complexes are as follows:

| | |
|---|---|
| $AlCl_2OCH_3$ | $AlBr_2OC_2H_5$ |
| $AlBr_2OCH_3$ | $Al(OCH_3)_3$ |
| $AlClBrOCH_3$ | $Al(OC_2H_5)_3$ |
| $AlCl(OCH_3)_2$ | $SbCl_2OCH_3$ |
| $AlBr(OCH_3)_2$ | $SbBr_2OCH_3$ |
| $AlCl_2OC_2H_5$ | $Sb(OCH_3)_3$ | and the like.

Compounds representative of the class $MX_n$ which may be employed in accordance with the process of the present invention are those customarily identified as the Friedel-Crafts type metal halides. These are, for example,

| | |
|---|---|
| AlCl₃ | ZnCl₂ |
| AlBr₃ | SnCl₄ |
| AlClBr₂ | TiCl₄ |
| AlCl₂Br | ZrCl₄ |
| SbCl₃ | UCl₄ |
| AsCl₃ | | and the like.

tillate was collected in a graduated receiver. The percentage of product boiling between 80° C. and 93° C. was a measure of the amount of the branched chain heptanes produced in the isomerization reaction. The catalyst mixture in Run No. 4, although being heated at 150° C., was heated for a sufficient length of time to decompose the mass but not to remove from the mixture the free metal halide contained therein. The catalyst was prepared at 150° C. and then cooled immediately to room temperature.

Table

| | Catalyst preparation | | | Isomerization of N-heptane at room temperature in atmosphere of dry HCl | | | |
|---|---|---|---|---|---|---|---|
| Run No. | Reactants employed in preparing catalyst, molar ratios | Decomposition temperature, °C. | Free metal halide removed | Catalyst grams | N-heptane, c. c. | Agitation and reaction contact time, hours | Distillate 80-93° C., vol. per cent |
| 1 | AlCl₃ | | | 10 | 29.0 | 17 | 11.5 |
| 2 | AlBr₂OCH₃+AlBr₃ | 160 | No | 8 | 22.0 | 2.5 | 5.5 |
| 3 | AlCl₂OCH₃+AlBr₃ | 160 | No | 6 | 29.0 | 2.5 | 5.5 |
| 4 | Al(OC₂H₅)₃+4AlCl₃ | ¹150 | No | 5 | 20 | 7.5 | 7.0 |
| 5 | 3CH₃OH=3AlCl₃+AlBr₃ | 110 | No | 10 | 30 | 18 | 14.0 |
| 6 | Al(OCH₃)₃+3AlBr₃ | 200 | Yes | 5 | 20 | 7 | 21.0 |
| 7 | AlCl₂OCH₃+SbCl₃ | 180 | Yes | 7.1 | 20 | 8 | 22.5 |
| 8 | AlCl₃OCH₃+SbBr₃ | 180 | Yes | 5 | 20 | 19 | 31.0 |
| 9 | AlBr₂OCH₃+AlBr₃ | 160 | Yes | .5 | 15 | 2.5 | 34.5 |
| 10 | AlBr₃ | | | 22 | 18 | 2 | 10.0 |
| 11 | AlCl₂OCH₃+AlBr₃ | 160 | Yes | 7 | 30 | 18 | 35.0 |
| 12 | CH₃OH+2AlBr₃ | 180 | Yes | 6.8 | 30 | 18 | 41.5 |

¹ Fused.

As previously pointed out, still a further modification involves the reaction of a lower alkyl monohydric alcohol such as methyl alcohol, ethyl alcohol, n-propyl alcohol, isopropyl alcohol, etc., with two or more mols of one of the hereinmentioned Friedel-Crafts type metal halides. The resulting compounds are thought to have the following empirical formula, although there is no intention to limit the invention to this formula since at best it constitutes merely an empirical formula based upon analytical data. The formula is believed to be as follows:

$$MX_2OR.4M'OX$$

wherein the characters have the same designation as previously stated.

The following examples, the data of which are presented in the accompanying table, are illustrative of the character of the invention. It is not intended, however, that the invention be limited thereto.

Runs Nos. 1 and 10 are inserted in the table merely for comparative purposes. These catalysts were CP grade of aluminum chloride and aluminum bromide, respectively. The decomposition temperature stated is that temperature to which the reaction mass was heated in order to eliminate the alkyl halide as formed in the process of reaction. The resultant catalyst in each instance, in the amount indicated in grams, was contacted at room temperature, under an atmosphere of dry hydrogen chloride, with liquid normal heptane in the amount indicated and the admixture agitated for the specified number of hours. The liquid was then separated from the solid catalyst complex and distilled in a distillation column packed with a glass spiral wrapped on a solid glass rod. The fractionating power of the column used was considered to be equivalent to about 7 theoretical plates. The distilland was measured by volume and on fractionation the dis-

Having now fully described and illustrated the character of the invention, what is desired to be secured by Letters Patent is:

1. A process of isomerizing normal paraffins containing at least four carbon atoms per molecule to form the corresponding branched chain paraffins which comprises contacting said normal paraffins under isomerization reaction conditions, in the presence of a halogen-containing promoter, with a catalyst mass prepared by admixing a metal halide of the Friedel-Crafts type with an alkoxy derivative of an aluminum halide, and heating the resultant mass to remove alkyl halide.

2. A process as in claim 1 wherein the catalyst mass is heated sufficiently to remove a major portion of the uncombined metal halide of the Friedel-Crafts type therefrom.

3. A process as in claim 1 wherein the catalyst mass is prepared from an aluminum halide and a methoxy derivative of an aluminum halide and wherein the resultant catalyst mass is heated sufficiently to remove a major portion of the uncombined metal halide and methyl halide therefrom.

4. A process of isomerizing normal paraffins containing at least four carbon atoms per molecule to form the corresponding branched chain paraffins which comprises contacting said normal paraffins under isomerization reaction conditions in the presence of a halogen-containing promoter and a catalyst mass prepared by admixing an aluminum halide taken from the group consisting of aluminum chloride and aluminum bromide with an alkoxy derivative of an aluminum halide taken from the group consisting of aluminum chloride and aluminum bromide and heating the resultant mass to remove alkyl halide.

5. A process of isomerizing normal heptane to form the corresponding branched chain heptanes which comprises contacting said normal heptane under isomerization reaction conditions in the presence of a halogen-containing promoter and a catalyst mass prepared by admixing a metal halide of the Friedel-Crafts type with an alkoxy derivative of an aluminum halide and heating the resultant mass to remove alkyl halide.

6. A process as in claim 5 wherein the catalyst mass is heated between about 80° C. and about 200° C. sufficiently to remove a major portion of the uncombined metal halide and alkyl halide therefrom.

7. A process as in claim 5 wherein the catalyst mass is prepared from an aluminum halide and a methoxy derivative of an aluminum halide and wherein the catalyst mass is heated between about 80° C. and about 200° C. sufficiently to remove a major portion of the uncombined aluminum halide and methyl halide therefrom.

8. A process as in claim 5 wherein the metal halide is taken from the group consisting of aluminum chloride and aluminum bromide and wherein the alkoxy derivative is of an aluminum halide taken from the group consisting of aluminum chloride and aluminum bromide, the resultant catalyst mass being heated between about 80° C. and about 200° C. sufficiently to remove a major portion of the uncombined aluminum halide and alkyl halide therefrom.

9. A process of isomerizing normal butane to form the corresponding isobutane which comprises contacting said normal butane under isomerization reaction conditions in the presence of a halogen-containing promoter and a catalyst mass prepared by admixing a metal halide of the Friedel-Crafts type with an alkoxy derivative of an aluminum halide and heating the resultant mass to remove alkyl halide.

10. A process as in claim 9 wherein the catalyst mass is heated between about 80° C. and about 200° C. sufficiently to remove a major portion of the uncombined metal halide and alkyl halide therefrom.

11. A process as in claim 9 wherein the catalyst mass is prepared from an aluminum halide and a methoxy derivative of an aluminum halide and wherein the catalyst mass is heated between about 80° C. and about 200° C. sufficiently to remove a major portion of the uncombined aluminum halide and methyl halide therefrom.

12. A process as in claim 9 wherein the metal halide is taken from the group consisting of aluminum chloride and aluminum bromide and wherein the alkoxy derivative is of an aluminum halide taken from the group consisting of aluminum chloride and aluminum bromide, the resultant catalyst mass being heated between about 80° C. and about 200° C. sufficiently to remove a major portion of the uncombined aluminum halide and alkyl halide therefrom.

CHARLES A. KRAUS.
JOHN D. CALFEE.